น2,771,342
Patented Nov. 20, 1956

2,771,342
PRODUCTION OF NON-CAKING COPPERAS

Stephen A. Lamanna, Amherst, Va., assignor to American Cyanamid Company, New York, N. Y., a corporation of Maine No Drawing. Application December 2, 1953, Serial No. 395,854

3 Claims. (Cl. 23—126)

The present invention relates to the drying of wet copperas crystals and the formation of a dry, free-flowing, non-caking blend therefrom. The invention particularly relates to dried copperas of normal color containing an effective amount of a finely divided calcium carbonate as anti-caking agent therefor.

Pure copperas crystals have a pleasing bright, white-greenish appearance, and copperas crystals which do not have this appearance are generally regarded as substandard.

Copperas is produced principally as a by-product of the steel and titanium industries. It is produced by the steel industry principally as the result of treating sheet steel with dilute sulfuric acid to remove scale and rust therefrom, a process known as "pickling," and is produced by the titanium industry when a ferro-titaniferous ore is digested with hot sulfuric acid. Pickle liquors and the latter liquors are very similar, both containing roughly 15% free sulfuric acid by weight, and in both instances the copperas is recovered by chilling the liquors and separating the crystals by centrifuging.

As recovered, therefore, the copperas consists essentially of crystals of $FeSO_4.7H_2O$ wet with a small amount of dilute sulfuric acid. Such copperas contains about 48% to 50% of $FeSO_4$ by weight as compared with pure $FeSO_4.7H_2O$ which contains 54.5% $FeSO_4$ by weight. It is general practice in the titanium industry to wash the wet crystals to remove residual titanium values, very dilute or spent sulfuric acid, typically 2% acid, being used for this purpose.

Thus, commercial copperas crystals as produced normally carry a small amount of sulfuric acid having a strength between about 2% and about 15%.

Copperas crystals thus obtained may be dried at about 60° C. to a free-flowing and apparently dry form. However, the crystals thus obtained cake to a substantially solid mass when shipped or stored, with resulting inconvenience to the purchaser.

The discovery has now been made that when wet copperas crystals are dried to a free-flowing and apparently dry form as described and the product is blended with a small amount of a finely divided calcium carbonate, the thus treated copperas remains a free-flowing powder which may be stored and shipped without caking or without undergoing any significant color change.

The invention is primarily based upon our discovery that even after drying as described, a part of the sulfuric acid is tenaciously held by the crystals and that it is this free acid which is responsible for the tendency of the copperas crystals to cake or cement themselves together.

The invention is further based upon our discovery that when this free acid is neutralized with calcium carbonate after the copperas crystals have been dried, the copperas is converted into non-caking form without any change in color.

The invention is apparently specific to calcium carbonate. When other materials such as magnesium carbonate, sodium carbonate and slaked lime are employed in place of the calcium carbonate, the color of the copperas changes from its normal bright white-green to a dirty brown.

The amount of calcium carbonate which should be blended with the copperas should be at least sufficient to neutralize the free sulfuric acid present; that is, the amount should be at least stoichiometrically equal to the amount of sulfuric acid carried by the crystals, at least one mol of calcium carbonate being added per mol of sulfuric acid present. The amount of free sulfuric acid carried by the crystals can readily be determined by known analytical means. An excess of calcium carbonate does no harm and as a practical matter we find that from about 0.75% to about 1.5% of calcium carbonate based on the dry weight of the copperas constitutes an effective amount for anti-caking purposes. The presence of more than about 1.5% of calcium carbonate, while not being harmful, confers no advantage in this regard.

The calcium carbonate added should be in finely divided form to permit it to form an intimate blend with the copperas crystals, but excessive comminution (for example, into the pigmentary range), although not harmful, is not required as the protective action of the calcium carbonate is not primarily a simple coating one. In practice, good results have been obtained with calcium carbonate ground to pass through a 100-mesh screen..

The process of the present invention requires two principal steps. In the first step, the copperas crystals are dried to an $FeSO_4$ content of about 56% to 60% at a temperature below their melting point, the range of 57%–59% being preferred by reason of the bright appearance of the product. Copperas melts at 64° C. and the drying is therefore best performed at a temperature a few degrees lower, a safe margin being assured by maintaining the maximum temperature of the crystals during drying at about 60° C. Drying the crystals to the $FeSO_4$ content described is sufficient to dehydrate about ¼ to ¾ of the copperas to the pentahydrate form, $FeSO_4.5H_2O$. Some aggregation takes place on drying, and if desired these aggregates may be crushed to any convenient size.

The copperas may be dried in any suitable equipment, including tray dryers. In commercial operation a rotary, oil-fired drum dryer has performed very well.

In the second step, the dried copperas is blended with a calcium carbonate sufficiently comminuted to form an intimate blend therewith. The calcium carbonate may be pure calcium carbonate, but other forms of calcium carbonate, including crushed limestone, are substantially equally satisfactory.

Incorporation of the calcium carbonate is performed in the laboratory by simply tumbling the crystals with the specified amount of a finely divided calcium carbonate. In commercial practice a continuous, rotating, cylindrical blender has advantageously been used.

The particle size of the copperas in the blend is not critical, good results having been obtained with particles varying from fines to those as large as about ¼ of an inch in diameter.

The invention will be more particularly described in the following example which illustrates without limiting the invention.

Example

Copperas crystals obtained by chilling and centrifuging a dilute sulfuric acid liquor containing titania values were washed with 1.5% sulfuric acid to remove the titania values therefrom. The liquor had been formed by reaction of ilmenite ore concentrate with sulfuric acid of 90% strength to form a solid titanium sulfate digestion cake and dissolving the cake in water to a specific gravity of 1.55. The resulting wet crystals containing about 0.7% free sulfuric acid by weight were dried in a continuous, rotary, hot air dryer to an $FeSO_4$ content of 56% by weight, the exit temperature of the crystals being 60° C. The crystals aggregated during drying into clumps about ⅛ of an inch to about ¼ of an inch in size, some finer particles, however, being present.

A sample was taken from the dryer discharge and the larger aggregates crushed to a maximum size of about ⅛ of an inch.

One part of this crushed material weighing 2 kg. was stored in a stoppered glass jar. This part constituted the control sample.

A second sample, also weighing 2 kg. was taken from the crushed material and placed in a jar with 20 g. of 100-mesh ground limestone and the jar rotated on electric rolls until a uniform blend had been obtained.

Both jars were stored for 4 weeks at a temperature of about 75° F. At the end of this time the control sample was a nearly solid mass which could not be removed from the jar and which could be disintegrated only by crushing.

The sample to which the limestone had been added was substantially unchanged. It was a free-flowing powder which could readily be poured from the jar.

I claim:
1. Process for the preparation of copperas in dry, free-flowing form from wet copperas crystals carrying dilute sulfuric acid, which comprises drying said copperas to an $FeSO_4$ content of between about 56% and 60% at a temperature below the melting point thereof, and then blending the thus-dried crystalts with a finely divided calcium carbonate in effective anti-caking amount.

2. A process according to claim 1 wherein the copperas is dried to an $FeSO_4$ content of 57%–59%.

3. A process according to claim 1 wherein the calcium carbonate is crushed limestone.

References Cited in the file of this patent

UNITED STATES PATENTS

| | | |
|---|---|---|
| 640,026 | Ramage | Dec. 26, 1899 |
| 1,440,253 | Travers | Dec. 26, 1922 |
| 2,053,432 | Harvey | Sept. 8, 1936 |
| 2,429,759 | Hopton | Oct. 28, 1947 |

FOREIGN PATENTS

| | | |
|---|---|---|
| 365,981 | Great Britain | Jan. 28, 1932 |